US011203977B2

(12) United States Patent
Turney et al.

(10) Patent No.: US 11,203,977 B2
(45) Date of Patent: Dec. 21, 2021

(54) EXCESS FUEL FLOW TO DRIVE TURBINE

(71) Applicant: United Technologies Corporation, Farmington, CT (US)

(72) Inventors: Joseph Turney, Amston, CT (US); Michael K. Ikeda, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 28 days.

(21) Appl. No.: 16/739,598

(22) Filed: Jan. 10, 2020

(65) Prior Publication Data

US 2020/0232389 A1  Jul. 23, 2020

Related U.S. Application Data

(60) Provisional application No. 62/793,447, filed on Jan. 17, 2019.

(51) Int. Cl.
*F02C 7/00* (2006.01)
*F02C 7/232* (2006.01)
*F02C 7/143* (2006.01)
*F16K 17/20* (2006.01)

(52) U.S. Cl.
CPC ............. *F02C 7/232* (2013.01); *F02C 7/143* (2013.01); *F16K 17/20* (2013.01)

(58) Field of Classification Search
None
See application file for complete search history.

(56) References Cited

U.S. PATENT DOCUMENTS

| 3,690,100 A | * | 9/1972 | Wolf | F02C 7/143 |
| | | | | 60/206 |
| 4,041,697 A | * | 8/1977 | Coffinberry | F02C 7/14 |
| | | | | 60/39.281 |
| 5,156,001 A | * | 10/1992 | Mouton | F02C 7/14 |
| | | | | 60/734 |
| 5,392,595 A | * | 2/1995 | Glickstein | F02C 6/18 |
| | | | | 60/39.12 |

(Continued)

FOREIGN PATENT DOCUMENTS

EP  3067535 A1  9/2016

OTHER PUBLICATIONS

European Search Report for EP Application No. 20152563.1 dated Jun. 17, 2020.

*Primary Examiner* — Edwin Kang
(74) *Attorney, Agent, or Firm* — Carlson, Gaskey & Olds, P.C.

(57) ABSTRACT

A gas turbine engine includes a main compressor section and a main turbine section. A cooling air supply system cools a location in at least one of the main compressor section and the main turbine section. The cooling air supply system includes a tap for tapping cooling air compressed by the main compressor section, connected for passing the cooling air through a heat exchanger and to a boost compressor, and then to the cooling location in the at least one of the main compressor section and the main turbine section. A fuel supply system has a fuel tank for delivering fuel to a fuel pump. At least one valve for selectively returning fuel downstream of the main pump back to an upstream location. At least one return turbine drives at least one fluid moving device in the air cooling system.

2 Claims, 2 Drawing Sheets

(56) References Cited

U.S. PATENT DOCUMENTS

| | | | | |
|---|---|---|---|---|
| 5,414,992 | A * | 5/1995 | Glickstein | F02C 7/185 60/782 |
| 2006/0260323 | A1 * | 11/2006 | Moulebhar | F02C 7/268 60/793 |
| 2013/0008172 | A1 * | 1/2013 | Erickson | F02C 7/224 60/776 |
| 2014/0102071 | A1 * | 4/2014 | Ball, Jr. | F02C 7/224 60/39.52 |
| 2014/0102105 | A1 * | 4/2014 | Janapaneedi | F02C 6/06 60/736 |
| 2015/0330301 | A1 * | 11/2015 | Cedoz | F02C 3/10 60/791 |
| 2016/0265444 | A1 * | 9/2016 | Pool | F02C 7/236 |
| 2016/0312797 | A1 * | 10/2016 | Suciu | F01D 25/12 |
| 2016/0341497 | A1 * | 11/2016 | Kitaguchi | F28D 1/0435 |
| 2017/0175874 | A1 * | 6/2017 | Schwarz | F01D 21/00 |

* cited by examiner

EXCESS FUEL FLOW TO DRIVE TURBINE

CROSS-REFERENCE TO RELATED APPLICATION

This application claims priority to U.S. Provisional Application No. 62/793,447 filed Jan. 17, 2019.

BACKGROUND

This application relates to a system for use on a gas turbine engine wherein excess fuel flow, downstream of a pump, is utilized to drive a turbine.

Gas turbine engines are known and have a number of components and systems. One such system is a fuel supply system. As known, fuel is stored in a fuel tank and driven by a pump to a combustor and, in particular, to fuel nozzles. The volume demand for fuel needed by a gas turbine engine varies greatly during operation of the engine. Thus, it is also known to divert fuel downstream of the fuel pump back to the tank when the demand is less.

It is also known to include a pressure relief valve downstream of the pump, which serves to selectively bypass the fuel back to an upstream end of the pump.

It has been typical that the fuel, having been pressurized by the pump, but being returned has not had the excess pressure recaptured.

Another system on a gas turbine engine is a cooled cooling air system. As can be appreciated, any number of components on a gas turbine engine can become unduly hot. Thus, cooling air is provided. In modern gas turbine engines, this cooling air must be at a relatively high pressure.

It is known to tap pressurized air from a compressor section, cool that air, and then drive the air with a boost compressor back into a location to be cooled. It is also known to drive cooling air across the heat exchanger to cool the tapped compressed air.

SUMMARY

In a featured embodiment, a gas turbine engine includes a main compressor section and a main turbine section. A cooling air supply system cools a location in at least one of the main compressor section and the main turbine section. The cooling air supply system includes a tap for tapping cooling air compressed by the main compressor section, connected for passing the cooling air through a heat exchanger and to a boost compressor, and then to the cooling location in the at least one of the main compressor section and the main turbine section. A fuel supply system has a fuel tank for delivering fuel to a fuel pump. At least one valve for selectively returning fuel downstream of the main pump back to an upstream location. At least one return turbine drives at least one fluid moving device in the air cooling system.

In another embodiment according to the previous embodiment, a fan drives air across the heat exchanger to cool the cooling air, and the at least one fluid moving device is one of the fan or the boost compressor.

In another embodiment according to any of the previous embodiments, the at least one fluid moving device is both the fan and the boost compressor.

In another embodiment according to any of the previous embodiments, a metering valve is positioned downstream of the fuel pump and upstream of a combustor which receives fuel from the fuel pump. The metering valve selectively diverts a portion of fuel downstream of the fuel pump back to a fuel tank. A fuel return line connects the metering valve to the fuel tank. The at least one return turbine is on the fuel return line.

In another embodiment according to any of the previous embodiments, there are at least two return turbines with one on a bypass line and one on the return line.

In another embodiment according to any of the previous embodiments, a junction is positioned downstream of the fuel pump. The bypass line passes through a pressure relief valve to return fuel from the junction back to a location upstream of the fuel pump. The at least one return turbine also includes a bypass turbine mounted on the bypass line.

In another embodiment according to any of the previous embodiments, the at least one return turbine drives the at least one fluid moving device through a shaft.

In another embodiment according to any of the previous embodiments, the at least one fluid moving device is the boost compressor.

In another embodiment according to any of the previous embodiments, a metering valve is positioned downstream of the fuel pump and upstream of a combustor which receives fuel from the fuel pump. The metering valve selectively diverts a portion of fuel downstream of the fuel pump back to a fuel tank. A fuel return line connects the metering valve to the fuel tank. The at least one return turbine is on the fuel return line.

In another embodiment according to any of the previous embodiments, there are at least two return turbines with one on a bypass line and one on the return line.

In another embodiment according to any of the previous embodiments, a junction is positioned downstream of the fuel pump. The bypass line passes through a pressure relief valve to return fuel from the junction back to a location upstream of the fuel pump. The at least one return turbine also includes a bypass turbine mounted on the bypass line.

In another embodiment according to any of the previous embodiments, the at least one return turbine drives the at least one fluid moving device through a shaft.

In another embodiment according to any of the previous embodiments, a metering valve is positioned downstream of the fuel pump and upstream of a combustor which receives fuel from the fuel pump. The metering valve selectively diverts a portion of fuel downstream of the fuel pump back to a fuel tank. A fuel return line connects the metering valve to the fuel tank. The at least one return turbine is on the fuel return line.

In another embodiment according to any of the previous embodiments, there are at least two return turbines with one on a bypass line and one on the return line.

In another embodiment according to any of the previous embodiments, a junction is positioned downstream of the fuel pump. The bypass line passes through a pressure relief valve to return fuel from the junction back to a location upstream of the fuel pump. The at least one return turbine also includes a bypass turbine mounted on the bypass line.

In another embodiment according to any of the previous embodiments, a junction is positioned downstream of the fuel pump. The bypass line passes through a pressure relief valve to return fuel from the junction back to a location upstream of the fuel pump. The at least one return turbine is mounted on the bypass line.

In another embodiment according to any of the previous embodiments, the at least one return turbine drives the at least one fluid moving device through a shaft.

In another featured embodiment, a gas turbine engine includes a main compressor section and a main turbine section. There is a means for cooling a location in at least one of the main compressor section and the main turbine section. The means for cooling includes a tap for tapping cooling air compressed by the main compressor section, passing the cooling air through a heat exchanger and to a boost compressor, and then to the cooling location in the at least one of the main compressor section and the turbine section. There is also a means to supply fuel having means to pressure fuel and delay it to a combustor. At least one valve selectively returns fuel downstream of the main pump back to an upstream location. At least one return turbine drives at least one of a fluid moving device in the air cooling system.

In another embodiment according to the previous embodiment, the at least one fluid moving device is the boost compressor.

In another embodiment according to any of the previous embodiments, a fan drives air across the heat exchanger to cool the cooling air. The at least one fluid moving device is one of the fan or the boost compressor.

These and other features may be best understood from the following drawings and specification.

DETAILED DESCRIPTION

Figure 1:
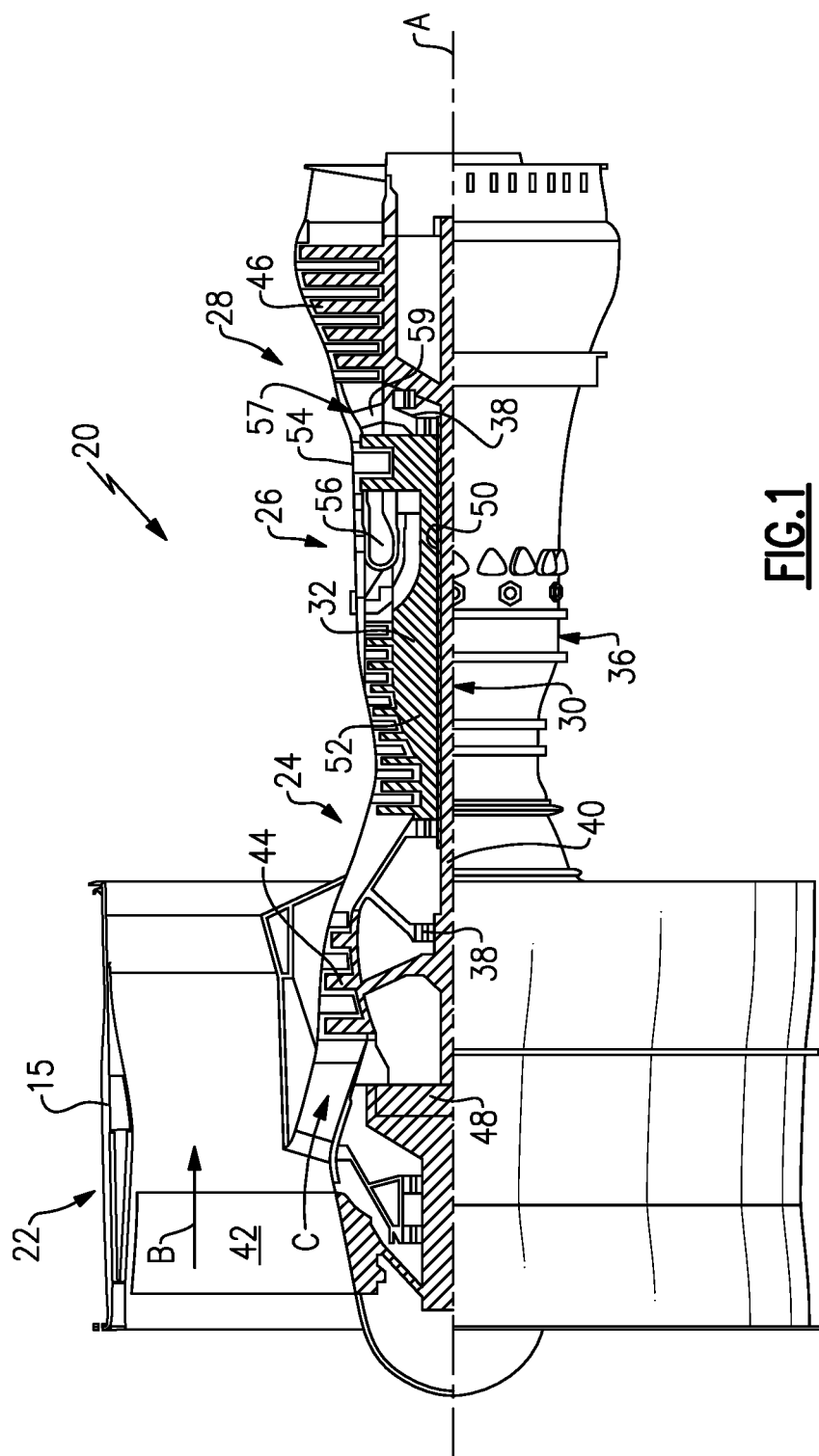
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ °R)/(518.7° R)]^{0.5}$. The "Low corrected fan tip speed" as disclosed herein according to one non-limiting embodiment is less than about 1150 ft/second (350.5 meters/second).

Figure 2:
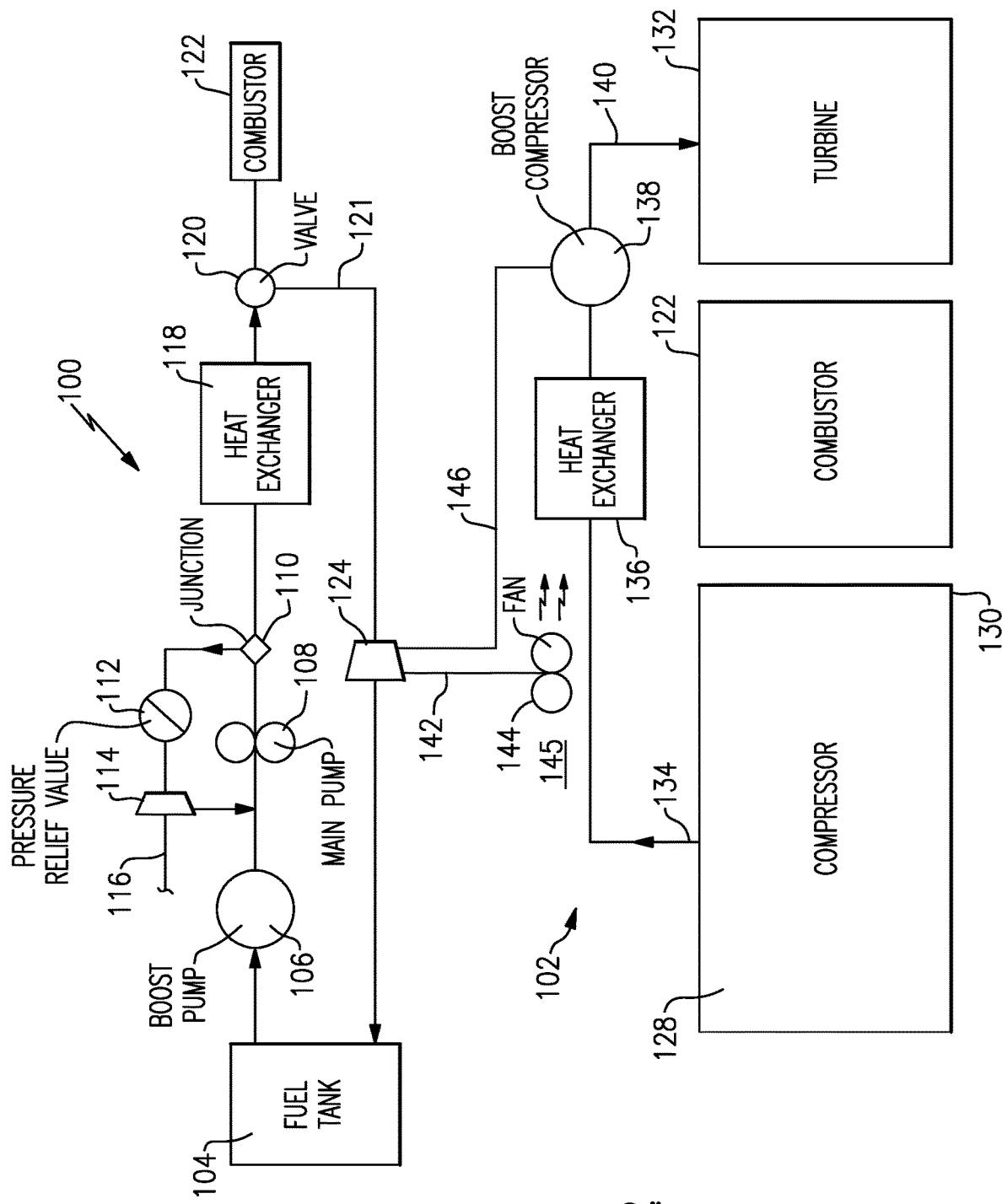
FIG. 2 schematically shows a gas turbine engine and associated systems.

FIG. 2 shows a fuel supply system 100 and a cooled cooling air system 102 associated with a gas turbine engine that may be similar to the gas turbine engine shown in FIG. 1.

A fuel tank 104 stores fuel for delivery to a boost pump 106 and a main fuel pump 108. An intersection 110 downstream of the main fuel pump 108 may recirculate that fuel through a pressure relief valve 112. Fuel which has moved passed the pressure release valve is returned to an upstream end of the pump 108, as shown.

A turbine 114 is in this path at a location such that the pressurization of the fuel having passed through the pressure relief valve 112 drives turbine 114 to recapture some of this energy. A drive 116 is shown schematically and will drive associated systems, as described below.

Downstream of the junction 110 is a heat exchanger 118 which may be a fuel/air heat exchanger. A control valve 120 is downstream of the heat exchanger 118 and selectively delivers fuel either to the combustor 122 and, in particular, fuel nozzles, or into a return line 121 back to the fuel tank 104. The valve 120 is a standard component on a gas turbine engine in its fuel supply system, and changes the amount of fuel delivered to the combustor dependent on the operation of the engine. It may be called a metering valve. A turbine 124 is placed on the line 121.

Cooling air supply system 102 is shown associated with a main compressor section 128, the combustor 122, and a turbine section 132. Air is tapped at 134, which has been compressed by the compressor section 128. The air may be from a location which is upstream of a downstream most location 130 in the compressor section 128. Of course air from other locations, even downstream of location 130, may be used instead.

The air tapped at 134 passes through a heat exchanger 136 into a boost compressor 138. That air is returned at 140 to cool locations within the gas turbine engine such as in the turbine section 132. It should be understood that this flow is highly schematic.

In fact, the fuel return line 140 is often intermediate the downstream end 130 and the combustor 122, and then extends radially inwardly and axially to the turbine section 132. In addition, the line 140 can provide cooling air to the downstream portions of the compressor section 128 as well, or as an alternative, to cooling the turbine section 132.

The turbine 124 is shown having a drive 142 selectively driving a fan 144 to drive air from a bypass duct 145 across the heat exchanger 136, and cool the air from the tap 134. A second drive 146 is shown driving the boost compressor 138.

The drive 116 from the turbine 114 may replace the drives 142 and/or 146 and utilized to supplement, or replace, the turbine 124. Both turbines could be alternatively utilized with each driving one of the fluid moving devices 144 and 138.

In addition, the drive 116 can drive other components besides the fluid moving devices 144 and 138.

A gas turbine engine could be said to include a main compressor section and a main turbine section. There is a means for cooling a location in at least one of the main compressor section and the main turbine section. The means for cooling includes a tap for tapping cooling air compressed by the main compressor section. The cooling air passes through a heat exchanger and to a boost compressor, and then to the cooling location in the at least one of the main compressor section and the turbine section. There is also a means to supply fuel having means to pressurize fuel and deliver it to a combustor. At least one valve selectively returns fuel downstream of the main pump back to an upstream location. At least one return turbine is driven by the return fuel, and drives at least one of a fluid moving device in the air cooling system.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
a main compressor section and a main turbine section;
a cooling air supply system for cooling a first location in at least one of said main compressor section and said main turbine section, said cooling air supply system including a tap for tapping cooling air compressed by said main compressor section, connected for passing said cooling air through a first heat exchanger and to a boost compressor, and then to the first location in said at least one of said main compressor section and said main turbine section;
a fuel supply system having a fuel tank for delivering fuel to a fuel pump;
at least one valve for selectively returning the fuel downstream of said fuel pump back to the fuel tank, at least one return turbine driving at least one fluid moving device in said cooling air supply system;
a fan drives air across said first heat exchanger to cool the cooling air, and said at least one fluid moving device includes both said fan and said boost compressor;
the at least one valve comprises a metering valve positioned downstream of said fuel pump and upstream of a combustor which receives the fuel from said fuel pump, said metering valve selectively diverting a portion of the fuel downstream of said fuel pump back to the fuel tank, and a fuel return line connecting said metering valve to said fuel tank;
wherein the at least one return turbine comprises at least two return turbines with one on a bypass line and one on said return line,
wherein a junction is positioned downstream of the fuel pump, and said bypass line passes through a pressure relief valve to return the fuel from said junction back to a second location upstream of said fuel pump,
wherein a second heat exchanger is located between the junction and the metering valve.

2. The gas turbine engine as set forth in claim 1, wherein said at least two return turbines drive said fan through a first shaft and said boost compressor through a second shaft.

\* \* \* \* \*